Sept. 9, 1930. H. HERRMANN 1,775,460
VARIABLE SPEED GEAR
Filed March 26, 1929

Inventor
Heinrich Herrmann
By Knight Bro
Attorneys

Patented Sept. 9, 1930

1,775,460

UNITED STATES PATENT OFFICE

HEINRICH HERRMANN, OF ESSEN, GERMANY, ASSIGNOR TO FRIED. KRUPP AKTIEN-GESELLSCHAFT, OF ESSEN-ON-THE-RUHR, GERMANY

VARIABLE-SPEED GEAR

Application filed March 26, 1929, Serial No. 350,085, and in Germany April 5, 1928.

The invention relates to variable speed gear and particularly to gears permitting passage from one speed to another, without interruption of the transmission of power, of the type described in Letters Patent No. 1,724,202, of August 13, 1929. The invention has for its object a variable speed gear which allows the provision of as many gear wheel trains as desired for different speed steps in a very simple and clear manner, the driving wheels of these gear wheel trains being arranged co-axially with a slip-clutch. This object is obtained according to the invention by connecting each of these driving wheels independently of the others with one half of the slip-clutch, by means of a coupling adapted to be operated at will, and further, by connecting on the one hand, by means of another coupling to be operated at will, the other half of the slip-clutch with the adjacent driving wheel of said gear wheel trains, and on the other hand, each following driving wheel with the preceding one.

Figure 1:
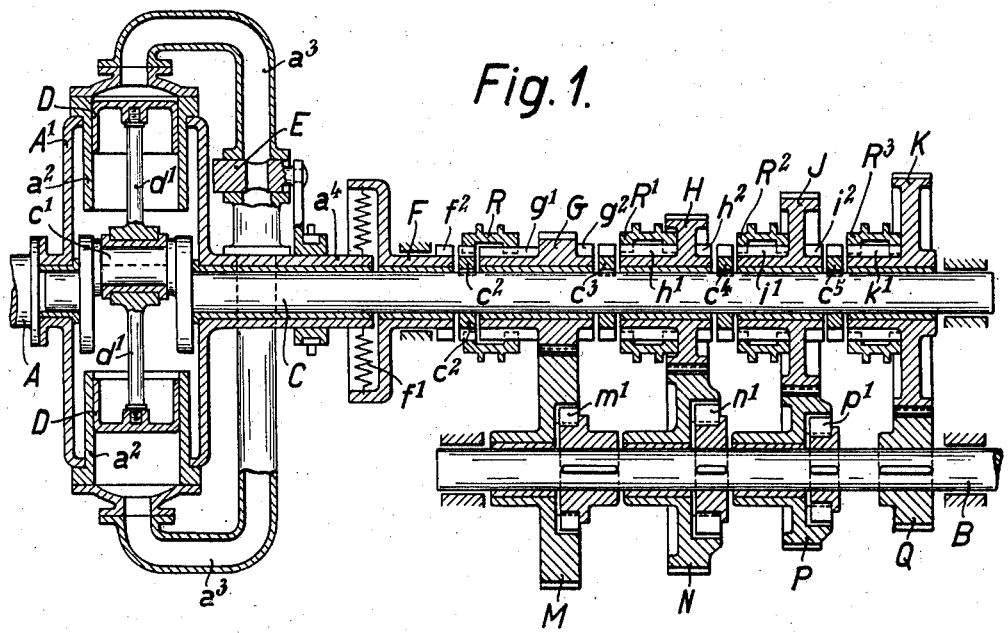
Figure 2:
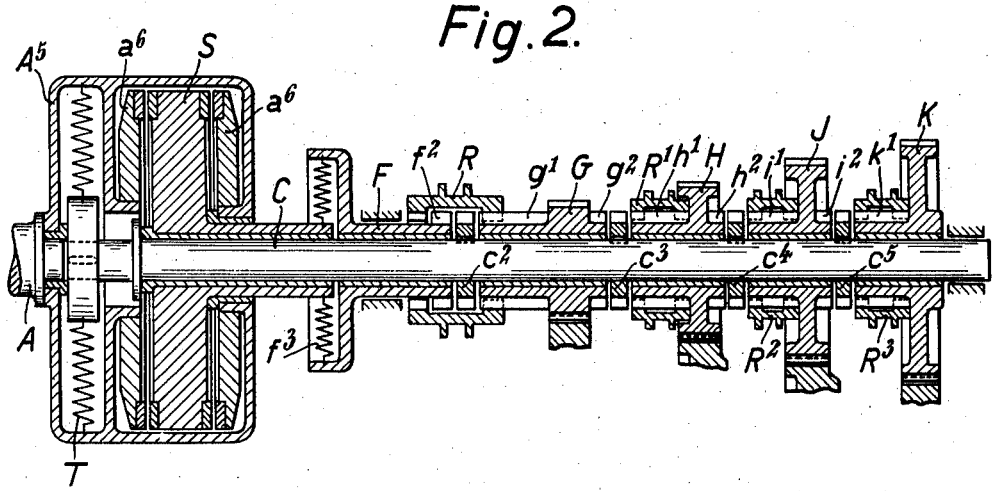

In order that the invention can be more easily understood, two embodiments of the same are illustrated in the accompanying drawing, each embodiment representing a variable speed gear intended to be used with a Diesel locomotive. In the drawing Fig. 1 is a longitudinal section through the first embodiment, and Fig. 2 is a similar section through the other embodiment.

The embodiment illustrated in Fig. 1 will be described first.

A denotes the driving shaft of the gear which shaft is connected e. g. with a Diesel engine, while B denotes the shaft serving to transmit the motion to the wheels of the locomotive. C is an intermediate shaft which is arranged co-axially with shaft A. Shafts A and C are interconnected by a main coupling which e. g. may be designed as a liquid coupling. This latter comprises in known manner a pump casing $A^1$ rigid on shaft A and including two opposite pump cylinders $a^2$ each lodging a piston D, and a crank $c^1$ arranged on shaft C with which crank are connected the pistons D by means of rods $d^1$, e. g. in the manner of a slot and crank gear. The cylinders $a^2$ are in communication over a by-pass pipe $a^3$ which by means of a throttling valve E can be either cut off wholly or partly, or opened entirely. When valve E in pipe $a^3$ is completely closed, a rigid connection exists between the two halves, formed by the pump casing $A^1$ and the crank $c^1$, of the liquid coupling; when valve E is completely open, no power transmission takes place from shaft A to shaft C; when valve E is partly closed, power transmission takes place with a relative motion of the coupling halves $A^1$ and $c^1$. The coupling thus forms a slip-clutch like the main coupling described in the patent cited above. The pump casing $A^1$ is mounted on shaft C opposite shaft A by means of a long hub $a^4$ adjacent to which is arranged a sleeve F which may rotate on shaft C like the pump casing and is connected to the hub $a^4$ by a spring coupling $f^1$.

The variable speed gear comprises four gear wheel trains each corresponding to one speed step. The driving wheels, denoted by G, H, J, K, of these gear trains are mounted for free rotation side by side on shaft C. The driven wheels in mesh with wheels G, H, J, K and denoted by M, N, P, Q, respectively, are mounted side by side on shaft B. The gear wheel train G, M next to the main coupling $A^1 c^1$ is intended to produce the lowest speed, while the following gear wheel trains H N, J P, and K Q each produce a speed higher than the preceding one. In the embodiment shown the driven wheel Q of the train K Q of the highest speed step is rigidly mounted on shaft B, while the driven wheels P, N, M of the trains of the preceding speed steps are each connected to shaft B by free wheel couplings $p^1$, $n^1$, $m^1$. The spur wheel Q however might be connected to shaft B likewise by a free wheel coupling.

The intermediate shaft C has rigidly mounted on it between sleeve F and spur wheel G a coupling half $c^2$ fitted with claws. This half coöperates with a corresponding coupling half $g^1$ provided on the hub of spur wheel G located on its right-hand side, and with a coupling half $f^2$ of analogous design on sleeve F, located on its left-hand side. Furthermore an outer coupling sleeve R is provided which can be shifted at will relatively to the three coupling halves $c^2$, $g^1$, $f^2$. When in the middle position as illustrated in Fig. 1, this sleeve R connects the coupling halves $c^2$ and $g^1$, in its left-hand end position it connects halves $g^1$ and $f^2$, while no connection at all is established with sleeve R in its right-hand end position. Hence, spur wheel G can be connected, by a coupling adapted to operate at will and formed by the parts $g^1$, R, $c^2$, on the one hand with the driven half $c^1$ of the slip-clutch $A^1$ $c^1$ and on the other hand, by the coupling $g^1$, R, $f^2$ over sleeve F and spring coupling $f^1$ with the driving half $A^1$ of the slip-clutch. Coupling arrangements that correspond exactly to that formed by the parts $c^2$, $g^1$, $f^2$, R are provided between the spur wheels G H, H J, and J K, the coupling half $c^2$ corresponding to coupling half $c^3$, $c^4$, $c^5$, likewise rigidly mounted on shaft C, while coupling half $g^1$ corresponds to coupling halves $h^1$, $i^1$, $k^1$, coupling half $f^2$ to halves $g^2$, $h^2$, $i^2$, and sleeve R to sleeves $R^1$, $R^2$, $R^3$.

In describing the mode of operation I start from the position illustrated in Figure 1. The main coupling $A^1$ $c^1$ is out of gear, so that the pump casing $A^1$ can revolve relatively to shaft C without power transmission. The coupling sleeve R is in a position interconnecting the coupling halves $g^1$ and $c^2$. The sleeves $R^1$, $R^2$, $R^3$ are in the right-hand end position in which the respective couplings are out of gear. To start, the main coupling is thrown into gear by setting valve E, whereby first a slip motion of the coupling halves $A^1$, $c^1$ takes place and then, after complete closure of valve E, a rigid connection is effected between shafts A and C. Shaft B is now driven through the members A, $A^1$, $c^1$, C $c^2$, R, $g^1$ G, M, $m^1$. Now sleeve R is shifted to the left-hand end position whereby spur wheel G is coupled with sleeve F. This can be effected without endangering the parts of the gear, since sleeve F is connected with the half $A^1$ of the main coupling by spring coupling $f^1$ and thus rotates at the same angular speed as sleeve R which during the described operation is likewise in connection with the half $A^1$ through $c^2$ C $c^1$. After the sleeve R has been shifted, the main coupling is thrown out again. An interruption of the power transmission, however, cannot take place, because spur wheel G has been connected to the driving half $A^1$ of the main coupling previous to the throwing out of the main coupling, through $g^1$, R, $f^2$, F $f^1$, $a^4$, independently of the coupling action of main coupling $A^1$ $c^1$. The power transmission to shaft B now takes place through A $A^1$ $a^4$, $f^1$ F $f^2$, R, $g^1$ G, M $m^1$. The intermediate shaft C with the crank $c^1$ now takes part in the rotation only by the friction existing in the mechanism of the main coupling, this rotation taking place with the same angular speed of coupling half $A^1$.

For the purpose of setting the gear to the next higher speed step, to be obtained by means of the gear wheel train H, N, spur wheel H is coupled with the coupling half $c^3$ and therewith also with shaft C, by shifting the coupling sleeve $R^1$. Dangerous blows cannot occur in this operation, as shaft C is only driven by friction. After this coupling operation shaft C can revolve only at an angular speed which is lower than that of coupling half $A^1$, as the angular speed of spur wheel N at most can be equal to that of shaft B driven by half $A^1$ through the train G, M, and the angular speed of shaft C therefore must be lower with regard to the lower gear ratio of the wheel train H, N. The difference between the speeds of shaft C and coupling half $A^1$ is now gradually eliminated by throwing in the main coupling again, so that at length shaft C revolves at the same speed as coupling half $A^1$, after pipe $a^3$ has been cut off completely by closing valve E. To reduce throttling losses in the main coupling, it will be of advantage to reduce at the same time temporarily the rate of revolutions of the Diesel engine by reducing the fuel supply thereto. Shaft B is now driven through $A^1$, $c^1$ C $c^3$, $R^1$, $h^1$ H, N, $n^1$ by the train H, N at a higher speed than it would be possible by train G, M, so that the free wheel coupling $m^1$ of train G, M automatically is disengaged whereby this train is put out of the power transmission. Now sleeve $R^1$ is shifted to left-hand end position whereby spur wheel H is coupled with spur wheel G. This can be done without endangering the gear parts, as spur wheel G which is in connection with half $A^1$ of the main coupling through $g^1$, R, $f^2$ F $f^1$, $a^4$, revolves at the same angular speed as sleeve $R^1$ which during the shift is also connected to half $A^1$ through $c^3$ C $c^1$. After sleeve $R^1$ has been shifted, the main coupling is thrown out again. An interruption of the power transmission, however, cannot occur, as spur wheel H has been coupled with the driving half of the main coupling independently of the coupling action of the latter, through $h^1$, $R^1$, $g^2$ G $g^1$, R, $f^2$ F $f^1$, $a^4$ previous to the commencement of the setting operation. Power is now transmitted to shaft B only through A $A^1$ $a^4$, $f^1$ F $f^2$, R, $g^1$ G $g^2$, $R^1$, $h^1$ H, N, $n^1$.

When the gear should be set to the higher speed steps corresponding to wheel trains J, P and K, Q or set again to a lower speed step, the setting operations required correspond to the described ones and need no further detailed explanation.

In the embodiment illustrated in Figure 2, the main coupling is designed as an electromagnetic friction coupling. The driving half, denoted by $A^5$, of this coupling is rigidly connected to the driving shaft A like half $A^1$ of the main coupling of Figure 1. The driven half, denoted by S, is rotatably arranged on shaft C between two friction disks $a^6$ rigidly mounted on coupling half $A^5$, and connected to sleeve F by a spring coupling $f^3$ corresponding to spring coupling $f^1$. By another spring coupling T shaft C is in connection with the coupling half $A^5$. As to the rest, the arrangement corresponds substantially to that illustrated in Figure 1. A difference exists only in so far as sleeve R when in its right-hand end position, couples the coupling half $c^2$ and, when in medium position, couples sleeve F with spur wheel G, while with sleeve R in left-hand end position illustrated in Figure 2, spur wheel G is uncoupled. As to the mode of operation this difference is of no importance.

As may be seen from the foregoing, the embodiment of Figure 2 differs in so far from the first-described embodiment as in the former the wheels G, H, J, K are coupled with the driving half $A^5$ of the main coupling by means of the couplings $g^1$ R $c^2$, $h^1$ $R^1$ $c^3$, $i^1$ $R^2$ $c^4$, and $k^1$ $R^3$ $c^5$, while their engagement with the driven half S of the main coupling is established by the couplings $g^1$ R $f^2$, $h^1$ $R^1$ $g^2$, $i^1$ $R^2$, $h^2$, and $k^1$ $R^3$ $i^2$, that means, the two groups of couplings have exchanged their function. The fundamental characteristic feature of the mode of operation, however, in particular the possibility of passing from one speed step to another without interruption of the power transmission, is not affected by the described modification.

By providing the spring couplings $f^1$, Figure 1, and T, Figure 2, the advantage is obtained that in the state of normal operation, when power transmission takes place independently of the coupling action of the main coupling, the considerable variations of the periodically varying turning moment of the Diesel engine are compensated for in the gear, which variations would cause a rapid wear of the claws of the wheel train couplings, which are operative in the state of normal operation. Furthermore, in the embodiment of Figure 2 the provision of the spring coupling $f^3$ prevents wear of the claws of those wheel train couplings which are used only with thrown-in main coupling.

I claim:

1. In a variable speed gear a driving member, a driven member, a slip clutch, one half of said slip clutch being permanently connected to said driving member, at least two gear wheel trains consisting of driving wheels coaxially with said slip clutch and driven wheels on said driven member, a free wheel coupling for said gear wheel trains, couplings to be operated at will between each of said driving wheels and one half of said slip clutch independently of the other wheels, coupling means to be operated at will between the other half of said slip clutch and the adjacent driving wheel and coupling means to be operated at will between adjacent driving wheels.

2. In a device according to claim 1, said couplings including an intermediate shaft connected to one half of said slip clutch, the driving halves of said couplings being mounted upon said intermediate shaft.

3. In a device according to claim 1, resilient means interposed between one half of said slip clutch and the driving halves of said couplings, and resilient means interposed between the other half of said slip clutch and the driving members of said coupling means.

The foregoing specification signed at Cologne, Germany, this 8th day of March, 1929.

HEINRICH HERRMANN.